(12) United States Patent
Hashimoto

(10) Patent No.: US 11,968,323 B2
(45) Date of Patent: Apr. 23, 2024

(54) DEVICE CONTROL BASED ON SIGNATURE

(71) Applicant: Comcast Cable Communications, LLC, Philadelphia, PA (US)

(72) Inventor: Mark Hashimoto, Sunnyvale, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 605 days.

(21) Appl. No.: 16/229,087

(22) Filed: Dec. 21, 2018

(65) Prior Publication Data

US 2020/0204684 A1 Jun. 25, 2020

(51) Int. Cl.
| | |
|---|---|
| H04W 4/90 | (2018.01) |
| G06F 16/65 | (2019.01) |
| G08B 25/00 | (2006.01) |
| G10L 15/06 | (2013.01) |
| H04M 11/04 | (2006.01) |

(52) U.S. Cl.
CPC .......... H04M 11/045 (2013.01); G06F 16/65 (2019.01); G08B 25/009 (2013.01); G10L 15/063 (2013.01); H04W 4/90 (2018.02); *G10L 2015/0631* (2013.01)

(58) Field of Classification Search
CPC ... H04M 11/045; H04M 11/04; G08B 25/009; G08B 13/1672; G08B 19/005; G08B 25/008; G06F 16/65; H04W 4/90; H04W 4/021; G10L 15/063; G10L 2015/0631; G10L 25/51; G10L 17/26
See application file for complete search history.

(56) References Cited

U.S. PATENT DOCUMENTS

| | | | |
|---|---|---|---|
| 9,984,542 B2 * | 5/2018 | Ekambaram ............ | G06F 1/163 |
| 10,121,494 B1 * | 11/2018 | Sundaram ............... | G10L 15/02 |
| 10,957,129 B2 * | 3/2021 | Gonzales, Jr. ......... | G07C 5/006 |
| 2006/0104312 A1 * | 5/2006 | Friar ........................ | G08B 1/08 |
| | | | 370/506 |
| 2006/0107298 A1 * | 5/2006 | Friar .................. | G08B 13/1672 |
| | | | 725/108 |
| 2017/0309142 A1 | 10/2017 | Phillips | |
| 2018/0096574 A1 * | 4/2018 | Ekambaram ....... | G08B 13/1618 |
| 2019/0043525 A1 * | 2/2019 | Huang .................... | G10L 25/21 |
| 2019/0348064 A1 * | 11/2019 | Lesso .................... | G16H 10/00 |
| 2020/0020328 A1 * | 1/2020 | Gordon ............... | G06F 21/6245 |
| 2020/0402378 A1 * | 12/2020 | Connell ............ | H04W 56/0015 |

* cited by examiner

*Primary Examiner* — Marcus Hammonds
(74) *Attorney, Agent, or Firm* — Banner & Witcoff, Ltd.

(57) ABSTRACT

Systems, apparatuses, and methods are described for identifying a recurring event associated with a premises, and automatically performing actions associated with the recurring event. A computing device may generate a signature for the recurring event to indicate a series of actions associated with the recurring event, may detect occurrence of the recurring event, and may perform one or more of the series of actions indicated by the signature.

24 Claims, 4 Drawing Sheets

DEVICE CONTROL BASED ON SIGNATURE

BACKGROUND

A location of a device in an individual's possession may be used to infer that individual's location. For example, a mobile phone may include global positioning system (GPS) circuitry that may determine the location of the mobile phone. That location may then be communicated from the mobile phone to another device. That other device may, based on the received location data, determine whether a person associated with the mobile phone is in a particular premises. There are drawbacks to such methods, however. A person may forget or lose a mobile phone. Location data transmitted by a mobile phone or other devices could be intercepted and used for undesirable purposes.

SUMMARY

The following summary presents a simplified summary of certain features. The summary is not an extensive overview and is not intended to identify key or critical elements.

Systems, apparatuses, and methods are described for performing actions associated with a recurring event. The recurring event may be associated with a premises and/or with a user. The recurring event may be an event associated with a user arriving at a premises, an event associated with a user leaving a premises, or any other type of event. During a training period, one or more computing devices may analyze audio data and/or non-audio data associated with the recurring event, and may generate, based on the analysis, an activity signature. The activity signature may indicate a series of actions that a user associated with those actions typically performs as part of the recurring event. Based on the activity signature, the recurring event may be detected and one or more actions may be performed.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
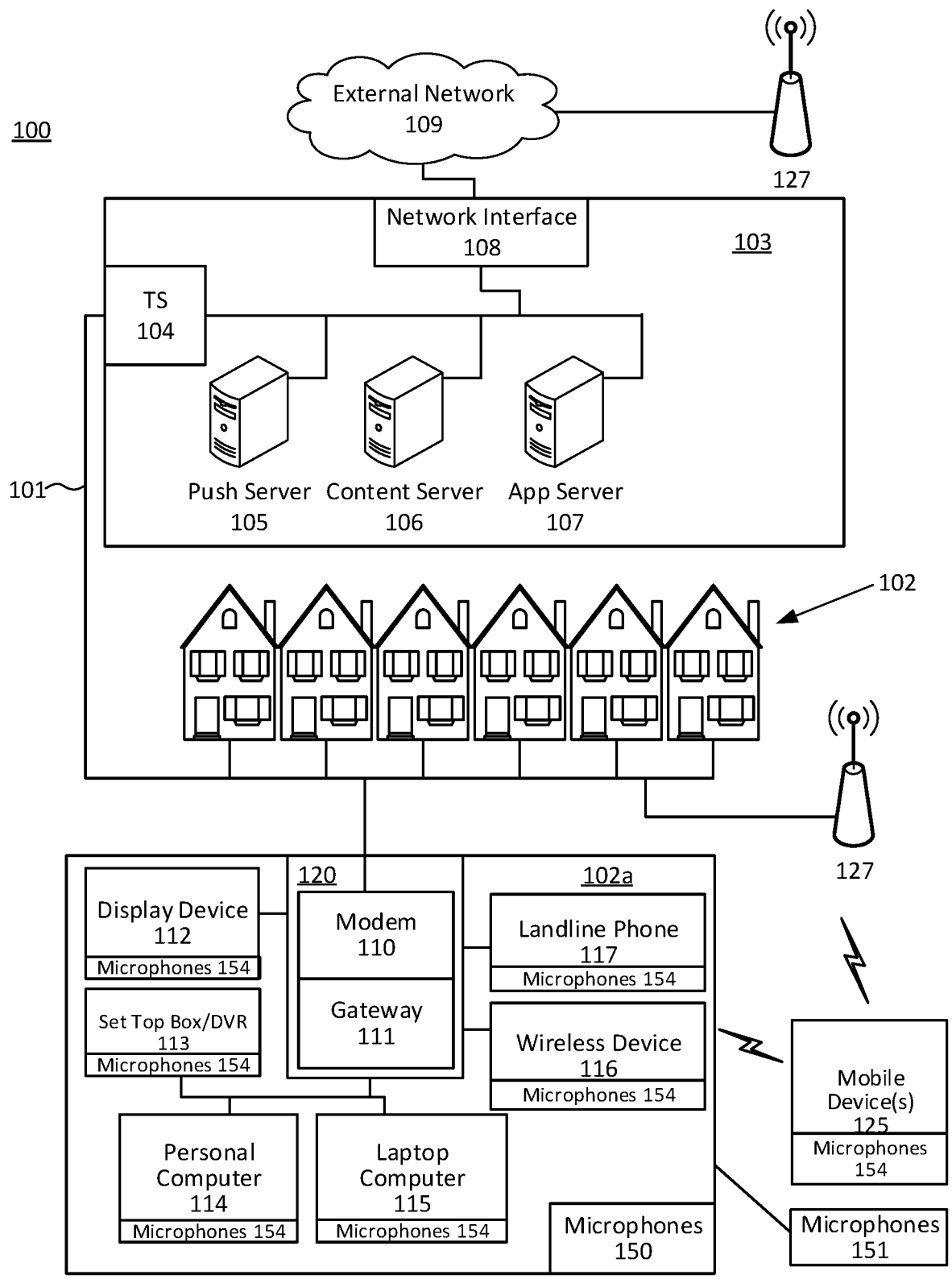
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. Still another application server may be responsible for generating an activity signature for a user associated with one of the premises 102

(e.g., an example premises 102a which will be described below), and for controlling devices/systems (which will be described below) associated with the premises 102 to automatically perform actions for the user if data associated with an entry to the premises 102 matches the activity signature. The local office 103 may comprise additional servers, such as additional push, content, and/or application servers, and/or other types of servers. Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

A security system (not shown), e.g., a home security system, may be installed in the premises 102a. The security system may comprise one or more of monitoring devices that monitor activities inside the premises 102a and/or within a predetermined proximity (e.g., within 10 meters) of the example premises 102a. The monitoring devices may comprise motion detecting devices (e.g., cameras, infrared sensors, etc.), sound detecting devices (e.g., sound detectors described below), sensors configured to monitor doors and windows for opening, fire detectors, and/or any other types of monitoring devices. The monitoring devices may be installed inside the premises 102a and/or within a predetermined proximity (e.g., within 10 meters) of the premises 102a. When a user leaves the premises 102a, the user may arm the security system by entering an arm code (e.g., a code including one or more digits) on a control panel of the security system. After being armed, the security system may monitor activities associated with the premises 102a, and may trigger an alarm (e.g., generating a beeping sound, activating a siren, calling 911, etc.) if the security system detects an abnormal activity (e.g., a fire, a door opening without the security system being disarmed within a certain time period, etc.). A user arriving at the premises 102a may disarm the armed security system by entering a disarm code on a control panel or other input device. Even if the security system is disarmed, the monitoring devices in the premises 102a may continue to monitor activities and generate and store data associated with the monitored activities.

One or more sound monitors may be used in the premises 102a. Sound monitors may detect sounds, analyze detected sounds, classify and/or otherwise generate audio data for detected sounds, and/or communicate that audio data to one or more other devices. A sound monitor may comprise a transducer (e.g., a microphone such as one or more of microphones 150, 151, and/or 154) to detect sound and convert that detected sound into an electrical signal. A sound monitor may further include one or more computing devices communicatively connected to the transducer and configured to analyze electrical signals from the transducer, classify and/or otherwise generate audio data associated with the analyzed electrical signals, store that audio data, and/or communicate that audio data to one or more other devices. Computing devices of a sound monitor may be dedicated to sound monitoring, and/or may be computing devices (e.g., the interface 120, the personal computer 114, the laptop computer 115, the wireless device 116, a stand-alone security system, etc.) that also perform other operations. Sound monitors associated with the premises 102a may monitor sounds inside the premises 102a and/or within a predetermined proximity (e.g., within 10 meters) of the premises 102a. The sound monitors may send audio data for monitored sounds, via the interface 120 and/or other computing device, to the application server 107 and/or to one or more other computing devices. For convenience, examples of the sound monitors communicating with the application server 107 are discussed herein. However, any or all of such communications could also or alternatively be sent to one or more other computing devices, and those one or more other computing devices could also or alternatively perform operations described herein as performed by the application server 107. Those one or more other computing devices could be external to the premises 102a and/or within the premises 102a. For example, some operations described herein as performed by the application server 107 could also or alternatively be performed by the interface 120, the gateway 111, the personal computer 114, the laptop computer 115, the mobile device 125, and/or other computing devices.

Audio data may indicate sound characteristics (e.g., sound intensity, sound peak, sound frequency, sound duration, and/or other sound characteristics) of a monitored sound. The application server 107 and/or other computing device(s) may identify, based on the received audio data, a user associated with the premises 102a, and may perform actions for the identified user by controlling the security system, the modem 110, the gateway 111, the display device 112, the set top box/DVR, the personal computer 114, the laptop computer 115, the wireless device 116, the landline phone 117, the mobile devices 125, and/or other devices associated with the premises 102a and/or associated with the identified user.

Figure 2:
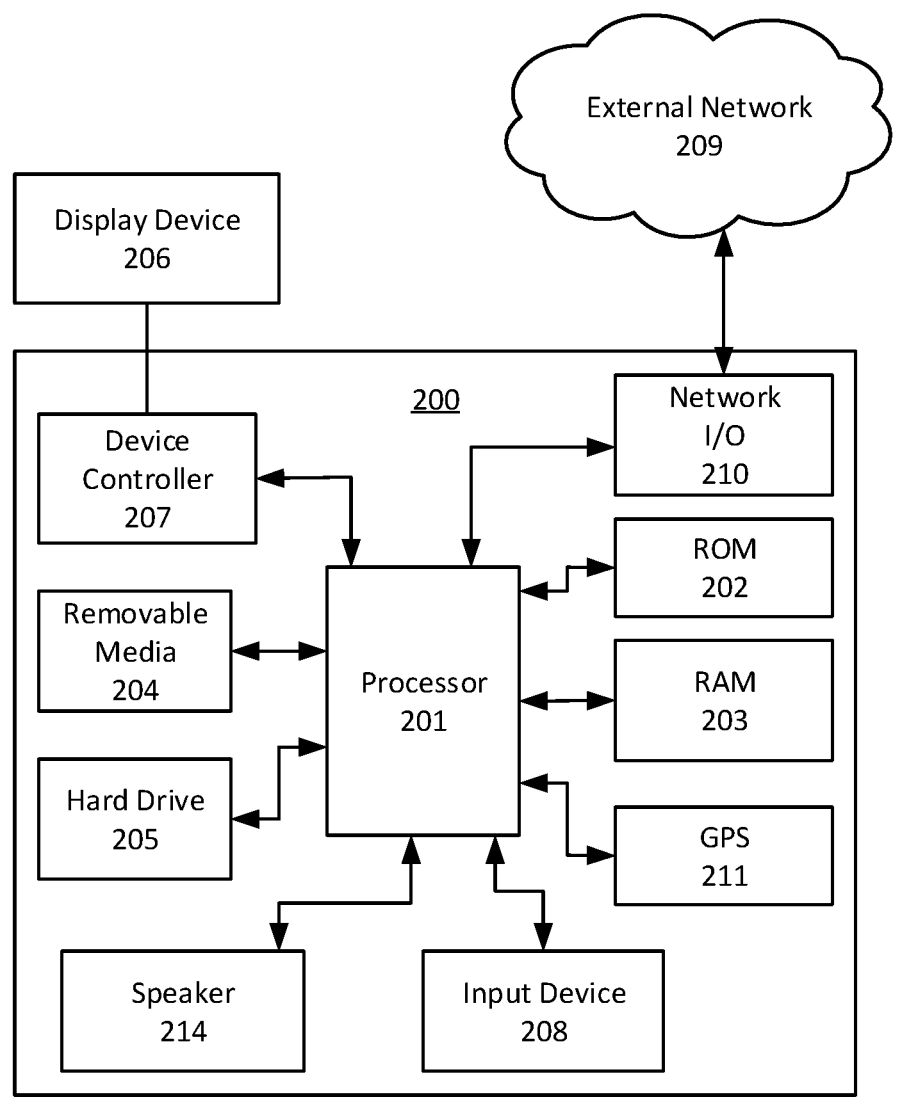
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103 (e.g., the application server 107), any of the wireless access points 127, any devices within the external network 109) and any other computing devices discussed herein. The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

The sound monitors associated with the premises 102a may send audio data to the application server 107 in real time (e.g., immediately after generation of that audio data). Additionally or alternatively, the sound monitors associated with the premises 102a may send audio data to the application server 107 periodically. For example, the sound monitors may store audio data as it is generated and send audio data to the application server 107 at regular intervals (e.g., every 5 seconds). Alternatively, or in addition, the sound monitors may send audio data to the application server 107 according to one or more predetermined patterns. The sound monitors may detect less sounds in some time windows (e.g., a time window of 10 am to 3:30 pm from Monday to Thursday) than other time windows (e.g., a time window of 9 am to 8 pm on Sunday). The sound monitors may send audio data to the application server 107 more frequently in the time windows during which more sounds are detected than in the time windows during which less sounds are detected. For example, the sound monitors may send audio data every 10 seconds for the time window of 10 am to 3:30 pm from Monday to Thursday, and may send audio data every 5 seconds for the time window of 9 am to 8 pm on Sunday. Alternatively, or in addition, the sound monitors may send audio data to the application server 107 when the sound monitors detect a sound. The time intervals for sending audio data to the application server 107 may be determined based on when a sound is detected and based on a time duration that the detected sound lasts. For example, if the sound monitors do not detect any sound for 20 seconds, during this 20-second time interval, the sound monitors need not send any audio data to the application server 107. After that 20-second time interval, if the sound monitors detect a sound that lasts 15 seconds, the sound monitors may monitor that 15-second sound for 15 seconds, may generate audio data associated with the 15-second sound, and may send the audio data to the application server 107. In this way, the network bandwidth may be saved because the sound monitors do not transmit audio data if no sound is detected. Also, at least because the detection of the sound is not interrupted, the sound may be detected more accurately and audio data generated based on the detected sound may present sound parameters (e.g., sound duration) of the actual sound more accurately. As such, a more accurate signature (which will be discussed later) may be generated based on the audio data. The application server 107 may process the audio data in real time (e.g., immediately after receipt of the audio data), and/or may store received audio data for batch processing.

A user associated with a premises may, on many days, perform similar actions at certain time periods during a day. For example, a user may arrive at a premises at approximately the same time, or within a certain time window, on each day of every week. When arriving at the premises, the user may often perform multiple actions that form an arrival behavior pattern that may be associated with the user. The application server 107 may generate an activity signature for the user based on the user's unique arrival behavior pattern. Different users may perform different series of actions when arriving at the same premises, may perform those actions in different amounts of time, may arrive (and thus perform a corresponding series of actions) at different times of the day, and/or may otherwise act in distinguishable ways.

For example, the premises 102a may be a home. Upon arrival at the premises 102a (e.g., when coming home from work), a user A may routinely enter the premises 102a via a garage door, may disarm a security system after entering the premises 102a, and may turn on a TV or other devices to cause display of a selected service. The garage door may generate a corresponding garage door opening sound, the security system may generate a beeping sound to indicate a house door opening and may generate key pressing sounds when the user A enters a disarm code on a control panel, and a TV may generate sound from the selected service. The user A may often select the same service (e.g., a channel such as ESPN) as part of his or her arrival routine. The sound monitors in the premises 102a may generate audio data for all of these sounds, and the audio data may include the time of occurrence of each sound. A user B may routinely enter the premises 102a via a front door using a front door key, may place her keys in a bowl, and may disarm the security system. When the user B enters the premises 102a, the front door key may generate a key turning sound to indicate a key turning in a lock, the front door may generate a door opening sound, the keys dropped in the bowl may generate distinctive object dropping sound, and the security system may generate a beeping sound to indicate a house door opening and key pressing sounds when the user B enters the disarm code on the control panel of the home security system. Other users may perform different series of actions when they arrive at the premises 102a. The sound monitors in the premises 102a may generate audio data for any or all sounds resulting from each user's arrival. The audio data may include, for each sound, data indicating one or more of a time of occurrence, intensity, frequency, duration, whether the sound is repeated, the microphone(s) detecting the sound, and/or other parameters. Different sound patterns resulting from arrivals of different users may indicate characteristic behavior patterns for each of those different users.

Different users performing the same or similar actions may still generate different sounds and/or different patterns of sounds. Users may have unique habits and/or gestures that may affect how sound is generated for an action. For example, users C and D may both enter the premises 102a via the front door using their door keys, may disarm the security system, and may turn on a TV to cause display of a particular service. However, the user C may turn his key slower than the user D, may push the front door more gently than the user D, and may spend more time disarming the security system (e.g., entering the disarm code slower) than the user D. Even though the user C and the user D may both turn on the TV to cause display of a service, the user C may spend more time than the user D to walk from the front door to a family room to turn on the TV. The sound pattern associated with the arrival of the user C may thus be distinguishable from the sound pattern associated with the arrival of the user D.

Different users may also be distinguished based on non-audio data. For example, when a user enters the premises 102a, the user's mobile device may be connected to the Internet with a unique network setting (e.g., username, a mobile phone number, etc.). Different users may be associated with different network settings, respectively. The gateway 111 may collect data associated with network settings and may send the collected data to the application server 107. As another example, different users may have different gaits. Motion detecting devices of the premises 102a may collect data associated with user's gaits and may send the collected data to the application server 107. As another example, two users may come arrive at the premises 102a during different time windows due to working schedules, school schedules, etc. The application server 107 may record data associated with the arrival time windows.

The application server 107 may generate an activity signature for each user associated with the premises 102a based on audio data associated with the user's actions, and/or based on non-audio data. The application server 107 may use activity signatures to determine if a particular user has arrived and, based on determining the user has arrived, perform (or cause performance of) one or more actions. The application server 107 may also or alternatively generate activity signatures associated with other types of events and use those activity signatures to identify users and/or to perform (or cause performance of) one or more actions based on those activity signatures.

Sounds may comprise human voices, animal sounds, audible mechanical sounds, inaudible mechanical sounds, electronic/alert sounds, an absence of sound, and/or any other type of sound. A human voice may be any sound produced by a human vocal cord, e.g., sound made by a human being using the vocal tract, e.g., talking sounds, screaming sounds. An animal sound may be any sound made by an animal, e.g., dog barking, cat meowing, bird chirping, etc. Audible mechanical sounds may comprise sounds created by doors, machinery, etc., and these sounds have audio frequencies within a range (e.g., 20 Hz to 20,000 Hz) of audible frequencies for humans. Examples of types of audible mechanical sounds include, without limitation, sounds created by: footsteps, an object dropping (e.g., onto a surface), a door opening, a door closing, a window opening, a window closing, a key turning a lock, glass broken, objects colliding, running water, a flushing toilet, household appliances (e.g., a microwave oven, a garbage disposal), lawn equipment (e.g., a lawn mower), HVAC equipment (e.g., an air conditioner or heater), and/or typing on a keyboard. Inaudible mechanical sounds may comprise sounds that are created by machinery, and these sounds have audio frequencies outside of the range of audible frequencies for humans. Examples of types of inaudible mechanical sounds include engines (e.g., automobile engines), and/or garage doors. Electronic/alert sounds may comprise sounds created by electronic equipment and/or to alert user of certain conditions. Examples of types electronic/alert sounds include, without limitation, sounds created by: a security system (e.g., sound generated in response to pushing control panel buttons, a tone to confirm arming or disarming, a tone to indicate an alarm will be triggered if a disarm code is not entered, a tone indicating opening of a door or window when the security system is not armed, a siren to indicate the alarm has been triggered), a fire alarm, and/or sounds from a TV (or radio or other device) outputting audio content. An absence of sound may comprise silence (e.g., absolute silence or sound only including background noise) that lasts for at least a certain time duration (e.g., 2 seconds). Based on values for one or more sound parameters (e.g., sound intensity, sound peak, sound frequency, sound duration, and/or other parameter), sounds may be classified into audio categories such as Human voice, Animal sounds, Mechanical sounds, Electronic/Alert, Absence of sound, and/or other categories. In the case where the sound monitors do not send audio data to the application server 107 if the sound monitors do not detect a sound (which was discussed previously), the absence of sound category may be associated with a certain time duration (e.g., at least 2 seconds) when the sound monitors do not send audio data.

Although the description herein refers to sound types and/or categories based on the physical phenomena that cause those sounds to be produced, that is for convenience of explanation. Audio data may or may not be specifically identified as representing a specific type of action that causes the sound(s) resulting in the audio data. For example, the server 107 may simply assign, as a sound type, an index number or other identifier to audio data that results from a garage door opening, and classify other audio data from other occurrences of the garage door opening using the same index number or identifier. One set of audio data may be determined to represent the same type of sound as another set of audio data based on values for sound parameters in one of the audio data sets being the same as (or within a defined range of) values for the same sound parameters in the other audio data set. Although not required, the physical phenomena that cause sounds can be identified for audio data, and the audio data classified based on that identification. Such identification may be performed, e.g., by comparing audio data to a library of sound types and/or based on user input.

A database may store, for each of multiple sound categories and/or sound types, data indicating values or ranges of values for one or more sound parameters. The database may be a local database of the application server 107 and/or a database maintained in one or more other computing devices. The application server 107 may compare values from the database with audio data, received from one or more sound monitors, associated with a monitored sound in the premises 102a. If parameter values in the received audio data match parameter values stored in the database for one or more sound categories and/or sound types, the application server 107 may determine that the monitored sound is in the sound category, and/or of the sound type, corresponding to the matched parameter values from the database.

Some sound categories and/or types (e.g., alert, fire alarm, glass broken, etc.) may be associated with abnormal activities (e.g., fire, forced entry, etc.), and on that basis, may be further classified as abnormal sound categories and/or types. Some sound categories and/or types (e.g., a garage door opening, a door opening, a key turning, etc.) may be associated with normal premises entries, and may be classified on that basis. One or more steps may be performed to preserve anonymity of audio data, activity signatures, and other information stored by the application server 107 in connection with the premises 102a. For example, if audio data is associated with a human voice, the actual words spoken may be not recorded. The application server 107 may only store data indicating that the audio data is associated with the Human voice category and/or values for certain sound parameters.

An activity signature may comprise one or more sound categories and/or types arranged in a particular time order.

Figure 3A:
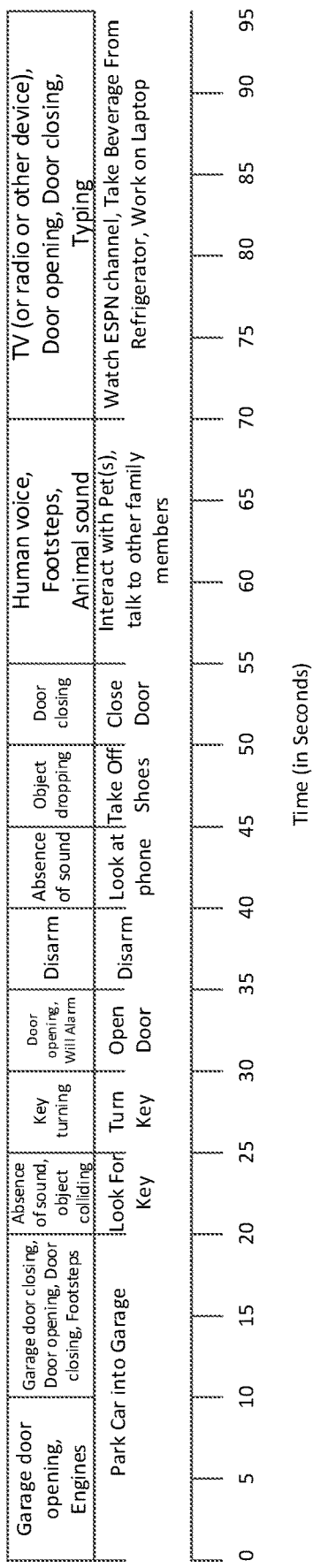
FIGS. 3A and 3B show examples of activity signatures.
Figure 3B:
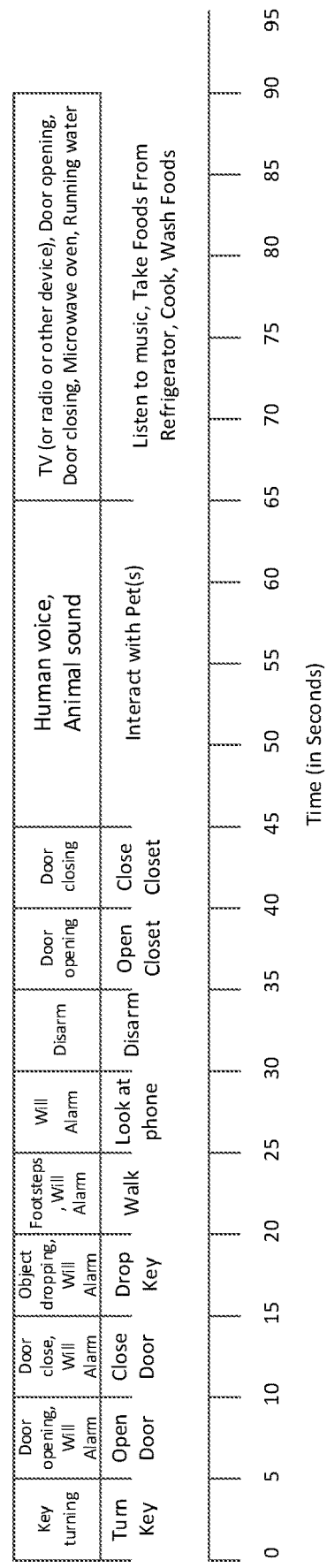

FIGS. 3A and 3B show examples of activity signatures. FIG. 3A shows an activity signature 300 for a user A associated with the premises 102a and a time window of 5 pm to 6:30 pm from Monday to Thursday. The activity signature 300 may correspond to a routine of the user A when arriving at the premises 102a at the end of a workday. FIG. 3B shows an activity signature 350 for a different user B associated with the premises 102a and a particular time window of 4:30 pm to 5:30 pm from Monday to Thursday. The activity signature 350 may correspond to a routine of the user B when arriving at the premises 102a at the end of a workday. Although omitted from FIGS. 3A and 3B for simplicity, the activity signatures may also include non-audio attributes of either or both users' routines when arriving at the premises 102a. In the examples of FIGS. 3A and 3B, the sound monitors in the premises 102a may send audio data associated every 5 seconds, and the application server 107 may process the audio data and generate activity signatures based on consecutive 5-second interval. Longer or shorter intervals may be used. All intervals need not be of the same duration. As explained in more detail in connection with FIG. 4, audio data, received from the sound monitors in the premises 102a over a training period, may be stored. That stored audio data may be analyzed to determine the sound categories and/or types normally associated with the intervals of the activity signatures when the users arrive at the premises 102a during the corresponding time windows. As also explained in connection with FIG. 4, the activity signatures 300 and 350 may be compared to audio data from the sound monitors in the premises 102a (e.g., during the applicable time windows) to determine whether monitored sounds match those signatures and indicate presence of the corresponding user in the premises 102a.

The bottom rows of the activity signatures 300 and 350 indicate time intervals of each activity signature. The top rows of the activity signatures 300 and 350 indicate sound categories and/or types associated with each interval. Some sound categories and/or types may be associated with two or more consecutive intervals. The middle rows of the activity signatures 300 and 350 include brief descriptions of the activities that may result in sounds of the type and/or category immediately above the description in the top row. The middle rows are included for purposes of explanation and may or may not be stored as part of the activity signatures 300 and 350.

The activity signature 300 (FIG. 3A) reflects actions in a 95 second signature period associated with the user A's arrival at the premises 102a. Activity signatures may reflect actions over signature periods of shorter or longer durations. At the start of the 0-5 second interval, the user A may start entering the premises 102a. The start of the 0-5 second interval may correspond to any time within the 5 pm-6:30 pm, Monday to Thursday, time window.

During the 0-10 second interval, the user A may open the garage door, and may drive his vehicle into the garage. The garage door opening and engine sound types may be associated with these actions.

After the user A parks his vehicle in the garage, and during the 10-20 second interval, the user A may stop the vehicle engine, close the garage door, get out of the vehicle, and walk to a garage entry door to the premises 102a. The garage door closing, door opening, door closing, and footsteps sound types may be associated with these actions.

After the user A arrives at the front of the garage entry door, and during the 20-25 second interval, the user A may take a break for 2 seconds without making any sound and then look for the key to the garage entry door in his pocket.

The absence of sound audio category and the object colliding sound type may be associated with these actions.

After the user A finds the key, and during the 25-30 second interval, the user A may insert the key to the garage entry door and turn the key to open the garage entry door. The key turning sound type may be associated with this action.

During the 30-35 second interval, the user A may open the garage entry door, and the security system may generate a tone to indicate an alarm will be triggered if a disarm code is not entered for a predetermined time period. The sound types of door opening and security system "will alarm" (e.g., a sound type associated with a tone to indicate an alarm will be triggered if a disarm code is not entered) may be associated with these actions.

After the garage entry door is opened, and during the 35-40 second interval, the user A may push control panel buttons on the control panel of the security system, and the security system may generate sound in response to pushing control panel buttons. If the entered disarm code is correct, the security system may be disarmed and generate a tone to confirm disarming. The security system disarm sound type (e.g., a sound type associated with the buttons pushing sound followed by a tone to confirm disarming) may be associated with these actions.

After the security system is disarmed, and during the 40-45 second interval, the user A may check emails on his mobile phone without making any sound. Absence of sound audio category may be associated with this action.

During the 45-50 second interval, the user A may take off his shoes and drop them on the floor. The object dropping sound type may be associated with these actions.

During the 50-55 second interval, the user A may close the garage entry door. The door closing sound type may be associated with this action.

After closing the garage entry door, and during the 55-70 second interval, the user A may walk in the hallway, and interact with a pet (e.g., a dog). Human voice and Animal sounds audio categories, and the footsteps sound type may be associated with these actions.

During the 70-95 second interval, the user A may turn on the TV and select his favorite service (e.g., the ESPN channel) for display, may open a refrigerator door and take out a bottle of beverage from the refrigerator, may close the refrigerator door, and may sit down on the sofa and start typing on his laptop keyboard. The sound types of a TV (or radio or other device), door opening, door closing, and typing on a keyboard may be associated with these actions.

The activity signature 350 (FIG. 3B) reflects actions in a 90 second signature period associated with the user B's arrival at the premises 102*a*. At the start of the 0-5 second interval, the user B may start entering the premises 102*a*. The start of the 0-5 second interval may correspond to any time within the 4:30 pm-5:30 pm, Monday to Thursday, time window.

During the 0-5 second interval, the user B may turn a front door key to open a front door of the premises 102*a*. The key turning sound type may be associated with this action.

During the 5-10 second interval, the front door may be opened, and a security system may generate a tone to indicate an alarm will be triggered if a disarm code is not entered. The sound types of door opening and will alarm may be associated with these actions.

During the 10-15 second interval, the user B may close the front door, and the home security system may continue to generate a "will alarm" tone. The sound types of door closing and will alarm may be associated with these actions.

During the 15-20 second interval, the user B may drop keys in a bowl, and the home security system may continue to generate a "will alarm" tone. The sound types of object dropping and will alarm may be associated with these actions.

During the 20-25 second interval, the user B may walk in the hallway, and the home security system may continue to generate a "will alarm" tone. The sound types of footsteps and will alarm may be associated with these actions.

During the 25-30 second interval, the user B may stop walking and check emails on her mobile device, and the home security system may continue to generate a "will alarm" tone. The sound type of will alarm may be associated with these actions.

During the 30-35 second interval, the user B may disarm the security system by entering a correct disarm code on control panel buttons of the security system. The security system disarm tone sound type may be associated with these actions.

During the 35-40 second interval, the user B may open a closet door to hang her coat on a hanger bench. The door opening sound type may be associated with this action.

During the 40-45 second interval, the user B may close the closet door. The door closing sound type may be associated with this action.

During the 45-65 second interval, the user B may play with the pet(s). Audio categories of Human voice and Animal sounds may be associated with these actions.

During the 65-90 second interval, the user B may turn on a radio and select her favorite music channel for play, may open a refrigerator door and take out foods, may close the refrigerator door, may cook the foods with a microwave oven, and may wash foods with running water from a faucet. The sound types of a TV (or radio or other device), door opening, door closing, microwave oven, running water may be associated with these actions.

One or more other types of data may also be included in an activity signature. Different users may generate different sound intensities when performing the same action. An activity signature may comprise one or more intensity tags (e.g., ranging from intensity 1 for lowest intensity 2 to intensity 10 for highest intensity) indicating a sound intensity associated with one or more of sound categories and/or types. The intensity tag may be a single intensity value (e.g., intensity 5) or a range of intensity (e.g., intensity 4-7). One or more users may perform one or more repetitive actions (e.g., walking) slower or faster than one or more other users. An activity signature may comprise one or more repetition rate tags (e.g., ranging from repetition 1 for lowest repetition rate to repetition 10 indicates for highest repetition rate) indicating a repetition rate associated with one or more sound categories or types. One or more users may perform one or more non-repetitive actions slower or faster than one or more other users. An activity signature may comprise one or more duration tags (e.g., data indicating a time duration) associated with one or more sound categories or types.

Time intervals in an activity signature may be replaced with corresponding ordinal numbers. For example, a 0-10 second interval may be replaced by the ordinal number 1, a 10-20 second interval may be replaced by the ordinal number 2, etc. Multiple sound categories and/or types associated with a single interval of an activity signature may indicate that sounds of those categories and/or types typically occur within a portion of a user's routine corresponding to the activity signature. For example, in the 0-10 second interval of the activity signature 300, the sound types of garage door opening and engine indicate that, within the first 10 seconds of the user A arriving home in the 5 pm to 6:30 pm, Monday-Thursday time window, each of those types of sounds is typically present during at least part of that 10 seconds. Within those 10 seconds, the two types of sounds may overlap. Within an interval of an activity signature, sounds of certain types may normally occur in a particular order. Optionally, tags may be included for the sound types and/or categories associated with an interval to indicate that order.

Non-audio data associated with arrival at the premises 102a may be considered during generation of an activity signature. When an arrival occurs, the application server 107 may determine a time when the arrival occurs. When the user A turns on the TV or other devices to cause display of a service, the TV or other devices may send, e.g., via the links 101, data indicating that service to the application server 107. Similarly, the user A's mobile device may connect to a local wireless network of the premises 102a when the user A arrives. The application server 107 may receive data from the gateway 111 indicating the network settings associated with the user A's mobile device (e.g., the user A's username, the user A's mobile phone number, etc.). A network setting associated with the user A may include one or more settings (e.g., the user A's birthday, the user A's age range, etc.) from which it can be determined whether the user A is an adult. One or more cameras in the premises 102a may capture images when a user enters, and image data for those captured images sent to the application server 107. The application server 107 may determine a corresponding figure category (e.g., a figure category of an adult, a figure category of a child, etc.) and/or other classifiers based on the image data. Based on one or more types of non-audio data indicating activities occurring during time periods when, as indicated by audio data also received by the application server 107, sounds associated with other activities are present, tags or other indicators of activity corresponding to that one or more types of non-audio data may be included in an activity signature.

As shown in FIG. 3A and FIG. 3B, the activity signature for the user B is different from the activity signature for the user A. The application server 107 may associate the activity signatures for the user A and the user B with the premises 102a. The application server 107 may store the activity signature for the user A and the activity signature for the user B in one or more databases for future uses. For example, when the application server 107 receives audio data and/or non-audio data from the premises 102a, the application server 107 may compare that received data with the stored activity signatures, may determine if the received data matches one of the stored activity signatures, and may automatically perform one or more actions based on a match. The one or more actions may be indicated in the matched activity signature or in other data associated with a user.

Figure 4:
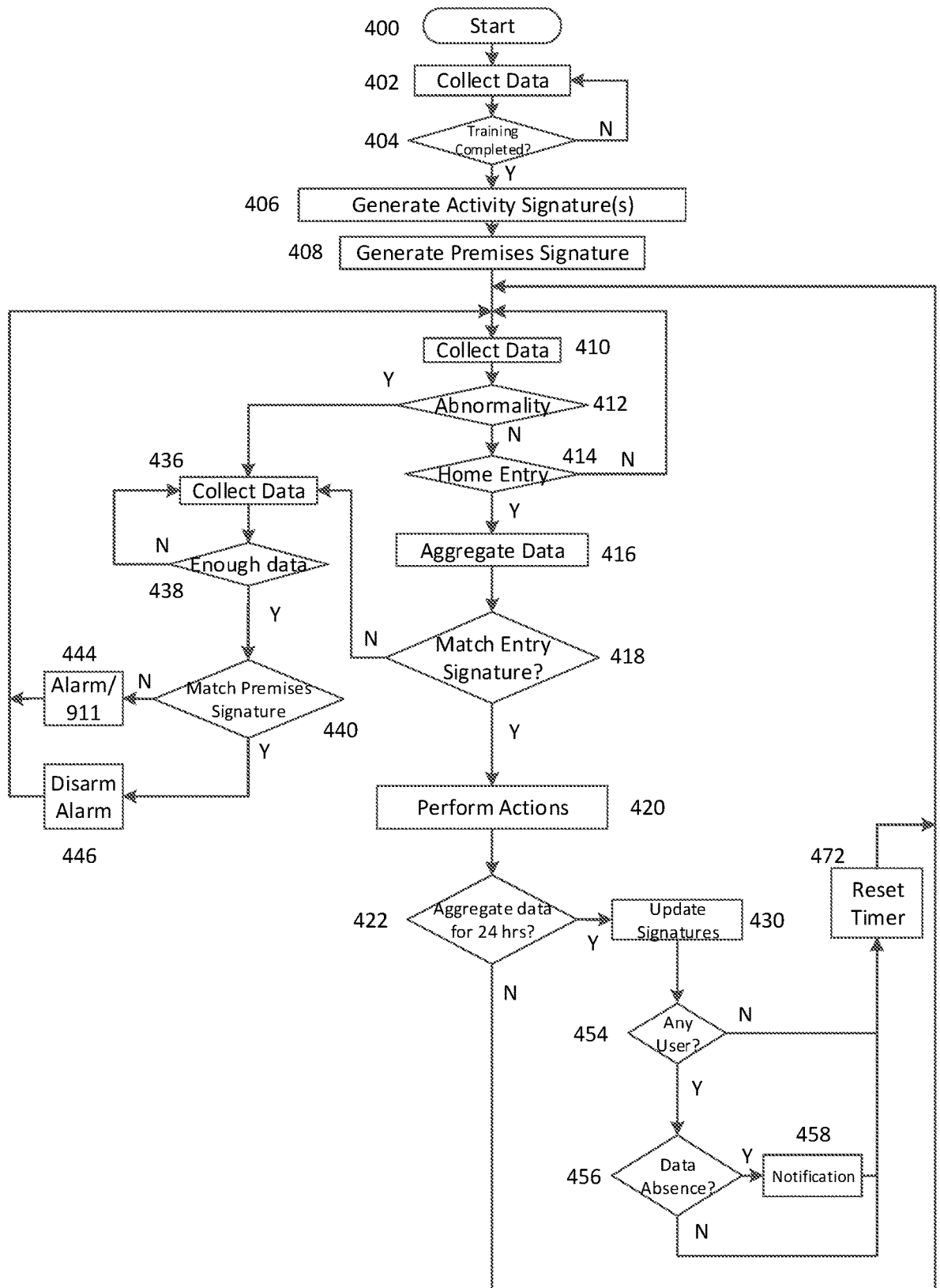
FIG. 4 is a flow chart showing an example of generating and using an activity signature.

FIG. 4 is a flow chart showing an example method of generating and using an activity signature. For convenience, FIG. 4 is explained using the example of the application server 107 performing operations. However, some or all of the operations described in connection with FIG. 4 could be performed by one or more other computing devices.

In step 400, one or more users associated with the premises 102a may request generation and/or use of one or more activity signatures. Based on the request, the application server 107 may start a predetermined training period (e.g., 60 days) to collect data for determining one or more activity signatures for one or more users associated with the premises 102a.

At step 402, the application server 107 may begin receiving and storing audio and/or non-audio data associated with the premises 102a. The application server 107 may receive that data, throughout the training period, from the sound monitors and/or other devices in and/or otherwise associated with the premises 102a. Similar series of data may be received at various times throughout multiple days within the training period. For example, on many Mondays, Tuesdays, Wednesdays, and Thursdays throughout the training period, the application server 107 may receive, in a time period of approximately 95 seconds duration occurring sometime between 5 pm and 6:30 pm, audio data indicating sound types in the order shown in FIG. 3A. By using statistical techniques (e.g., machine learning technology that will be described below), the application server 107 may determine, based on the multiple series of similar data, a pattern of audio data that indicates a behavior pattern of a user, and may generate a corresponding activity signature for that user.

At step 404, the application server 107 may determine whether the training period has expired. The application server 107 may determine that the training period has expired by determining that a training timer indicating the training period has expired, and/or by receiving a request (e.g., resulting from a user input) to end the training. If the training period has not expired, the step 402 may continue to be performed. If the training period has expired, the application server 107 may in step 406 use machine learning technology to process the data collected during the training period, and generate, based on the collected data, one or more activity signatures for one or more users associated with the premises.

The application server 107 may compare sound parameter values indicated by the collected audio data with the sound parameter values, stored in one or more databases, associated with known sound types and/or categories. Based on the comparison, the application server 107 may determine that some of the collected audio data is classifiable as sound types indicative of entry to the premises 102a (e.g., a garage door opening, a key turning, etc.). Based on determining audio data associated with entry, additional audio data for sounds occurring simultaneously with or within a time range (e.g., additional 100 seconds of audio data) may be identified as candidates for evaluation as part of an activity signature associated with arrival of a user at the premises 102a. That additional audio data may be processed by comparison of sound value parameters in that audio data to values for those parameters for various sound types. Recurring patterns of sounds associated with arrival at the premises 102a may be determined based on that processing. Using machine learning, activity signatures such as the activity signature 300 (FIG. 3A) and the activity signature 350 (FIG. 3B) may be generated and stored.

As discussed above in connection with FIGS. 3A and 3B, non-audio data associated with arrival may be taken into account when the application server 107 generates and determines an activity signature. For example, the application server 107 may use collection time tags of audio data associated with the premises entry to determine the time window for an arrival activity signature. For example, after the activity signature 300 (FIG. 3A) is identified, the application server 107 may record a collection start time tag indicating that collection of the audio data for the 0-5 second interval of the activity signature 300 is started, and a collection ending time tag indicating that collection of the audio data for the 0-5 second interval of the activity signature 300 is completed. The application server 107 may use one or more of these times tags to determine the time window for the activity signature 300.

Different users may perform arrival-related actions over time periods of different durations. Such durations may also be included as part of an arrival activity signature. For example, one user may typically take 70-100 seconds to perform a series of actions associated with premises arrival, and another user may typically take 10-25 seconds to perform another series of actions associated with premises arrival. When determining the time duration of the activity signature 300 (FIG. 3A), the application server 107 may determine that sound categories and/or types associated with an additional time period (e.g., 3 minutes) after a time point of 95 seconds do not change significantly compared to sound categories and/or types associated with the 70-95 second interval, and/or sound categories and/or types associated with the 0-95 second interval are sufficient to determine that the user A arrives at the premises 102a. The application server 107 may then determine that the time duration of the activity signature 300 is 95 seconds.

Alternatively, or in addition, the application server 107 may use slide window algorithm to determine a time duration of an activity signature. The algorithm may start with a predetermined initial time length (e.g., 60 seconds, time point 0 to time point 60, FIG. 3A) of audio data occurring simultaneously with or within a time range entry associated with the premises 102a. The initial time length of audio data may be identified as candidates for evaluation as part of an activity signature associated with arrival of a user at the premises 102a. The application server 107 may analyze the initial time length of audio data in a time sequence (e.g., starting from audio data of the time interval 0-5, FIG. 3A). If a new sound category/type occurs for a first time, the algorithm may update the time length by extending the time length for a first predetermined time period from the end of the time interval associated with the first occurrence of the new sound category/type. If a repeated sound category/type occurs for a second time, the algorithm may extend the time length for a second predetermined time period (shorter than the first predetermined time period) from the end of the time interval associated with the second occurrence of the repeated sound category/type. The algorithm may apply a shorter time extension for a repeated sound category/type that occurs more times. For example, if a repeated sound category/type occurs for a third time, the algorithm may extend the time length for a third predetermined time period (shorter than the second predetermined time period) from the end of the time interval associated with the third occurrence of the repeated sound category/type; if a repeated sound category/type occurs for a fourth time, the algorithm may extend the time length for a fourth predetermined time period (shorter than the third predetermined time period) from the end of the time interval associated with the fourth occurrence of the repeated sound category/type; and so on. If multiple sound categories/types are found to be associated with a same time interval, the algorithm may calculate a corresponding time extension for each one of the multiple sound categories/types, and may update the time length by the longest time extension among the calculated time extensions. If the time length is updated with a time extension, the updated time length may replace the previously determined time length. The application server 107 may continue to analyze the updated time length of the audio data. If no new sound category/type occurs and one or more repeated sound categories/types have occurred more than a predetermined number of times, the algorithm may determine not to extend the time length. The algorithm may determine that the last updated time length is the time duration of the activity signature.

During the training period for collecting data used to generate the activity signature 350, the user B may typically arrive at the premises 102a every day from Monday to Thursday during 4:30 pm-5:30 pm. On Saturdays, the user B may typically arrive at the premises 102a during 9 am-11 am and during 2 pm-5 pm. After the training period expires, the application server 107 may determine, by identifying the audio data that is associated with normal premises entry sound types, that the audio data collected in the 60-day training period indicates a total of 700 entries. Based on the collection time tags of that identified audio data, the application server 107 may determine, among the 700 entries, 40 entries occur during 4:30 pm-5:30 pm on Monday through Thursday. For each of the 40 entries occurring during 4:30 pm-5:30 pm on Monday through Thursday, the application server 107 may process additional audio data having time tags within a period (e.g., 100 seconds) of the time tag for the audio data indicating entry. The application server 107 may determine that, during 4:30 pm-5:30 pm on Monday through Thursday, there are 30 similar entries, out of the 40 entries, having the following sound types in the following order:

1: Key turning;
2: Door opening, Will alarm;
3: Door closing, Will alarm;
4: Object dropping, Will alarm;
5: Footsteps, Will alarm;
6: Will alarm;
7: Disarm;
8: Door opening;
9: Door closing;
10: Human voice, Animal sounds; and
11: TV (or radio or other device), Door opening, Door closing, Microwave oven, Running water.

Based on the above sound types, the application server 107 may generate the activity signature 350 for the user B. The application server 107 may similarly generate the activity signature 300 for the user A, as well as other activity signatures.

If the application server 107 determines that occurrence rate of a sound category or type does not satisfy a predetermined threshold, that sound category or type may be excluded from the activity signature. For example, when determining the activity signature 350, the application server 107 may determine that, among the 30 similar entries, the garage door opening sound type is associated with 2 home entries. The garage door opening sound type may thus be associated with 2/30=7% of the 30 home entries, for an occurrence rate of the garage door opening sound type of 7%. The occurrence rate (7%) of the garage door opening sound type may be less than a threshold (e.g., 10%), and the application server 107 may exclude the garage door opening sound type from the activity signature 350.

The application server 107 may add, in an activity signature, intensity tags, repetition rate tags, duration tags, and/or other tags that indicate sound characteristics of sounds monitored during similar entries. The application server 107 may determine values for these tags, based on average values of sound characteristics of corresponding monitored sounds.

If the application server 107 determines that the premises has a number of residents less than a predetermined number (e.g., 5), the application server 107 may simplify an activity signature by omitting some data (e.g., intensity tags, repetition rate tags, duration tags, etc.) from an activity signature. If the application server 107 determines that the premises has a number of residents more than a predetermined number (e.g., 20), the application server 107 may add more data (e.g., peak tags that indicate values of sound peaks of monitored sounds) to an activity signature.

The application server 107 may add non-audio data (e.g., applicable time window, selected services, network settings of a user's mobile device, network settings of a user, a user's figure category, etc.) to an activity signature. For example, when determining the activity signature 350, the application server 107 may determine, based on data received via links 101, that selection of a particular music radio channel is associated with more than a threshold (e.g., 60%) of the 30 similar entries. The application server 107 may add a service tag indicating that music channel in the activity signature 350.

Alternatively or in addition to machine learning technology, the application server 107 may generate an activity signature based on a user's input. The application server 107 may present users associated with a premises with a graphical presentation, a text presentation, or other presentations of audio and/or non-audio data associated with an entry to the premises, and may generate an activity signature based on the users' feedback. For example, the application server 107 may detect an arrival at the premises 102a and process audio and/or non-audio data associated with the arrival. The application server 107 may send an email message to each of the user A and the user B. The email message may include a series of pictures, arranged in a particular order, each presenting a corresponding one of sound categories and/or types associated with a corresponding one of a series of actions performed during the arrival. The email message may also include a graphical indication (e.g., a channel icon) of a service (e.g., the ESPN channel) selected during the arrival. The email message may also include an arrival time. The email message may request that, if the email recipient arrived the premises 102a at the indicated arrival time, performed the series of actions indicated by the series of pictures, and selected the service, the email recipient press a virtual confirmation button. The user A may press the virtual confirmation button. After receiving the confirmation from the user A, the application server 107 may generate the activity signature 300 for the user A based on the sound categories and/or types, the selected service, and the arrival time.

The application server 107 may associate activity signatures (e.g., the activity signatures 300 and 350) with an identifier of the premises 102a, e.g., by adding an address tag indicating an address of the premises 102a to the activity signatures 300 and 350. The application server 107 may store activity signatures in a local database of the application server 107 and/or in a database maintained in one or more other computing devices.

An activity signature may or may not be associated with a user. Associating an activity signature with an identifier of a user however may optimize management of activity signatures associated with a premises. For example, if an activity signature is associated with a roommate that moves out a premises, other users associated with the premises may identify the activity signature associated with the moved-out person and delete this activity signature. Associating a specifically identified user may occur, e.g., via a user interface that allows users to input users' identifiers for activity signatures and/or to associate activity signatures to other user profiles that may be maintained. After an activity signature is associated with an identifier of a user, data indicating the user's profile (e.g., the user's age range) may be added to the activity signature. Such data may be used to determine if the user is an adult.

A user may act differently depending on seasons/months of a year, days of a week, the time of day at which the user arrives at the premises 102a, and/or other time-related factors. For example, a child may have a different schedule in autumn when he goes back to school, compared to this child's schedule in summer when he does not go to school. In winter time, a user may take longer time to take off his coat and boots when he enters a premises. Different activity signatures may be generated for a single user based on the time-related factors. For example, the application server 107 may generate, for the user B, another activity signature that is associated with the user B's arrival in a 9 am-11 am, Saturday, time window and still another activity signature that is associated with the user B's arrival in a 2 pm-5 pm, Saturday, time window.

At step 408, the application server 107 may use data collected during the training period to generate a premises signature for the premises 102a. The premises signature may represent audio and/or non-audio attributes of the entire premises 102a under a normal circumstance in which no abnormal activities occurs. The premises signature may comprise a background signature, a normal activities signature, or any other signatures that may represent normal activities associated with the premises 102a.

A background signature may indicate audio and/or non-audio attributes of background activities associated with the premises 102a when no user is present in the premises 102a. The audio attributes may comprise one or more of sound categories and/or types. The one or more of sound categories and/or types need not be arranged in a particular time order. Similarly to recognizing the premises entries discussed above, the application server 107 may recognize premises leaves. If the application server 107 determines that the total number of premises entries equals to the total number of premises leaves, the application server 107 may determine that no user is present in the premises 102a. For example, during the training period, the application server 107 may determine that no user is present in the premises 102a during 9 am-3 pm on many Fridays. The application server 107 may compare sound parameter values indicated by the collected audio data during 9 am-3 pm on these Fridays with the sound parameter values associated with known sound types and/or categories. Based on the comparison, the application server 107 may determine that the following sound types and/or categories (optionally with corresponding intensity tags) are associated with the 9 am-3 pm, Friday, time window: Animal sounds with intensity 1 (dog barking outside the premises 102a), Animal sounds with an intensity range of 4-8 (dog barking inside the premises 102a), siren with intensity 1 (siren activated outside the premises 102a), engine with intensity 1 (vehicle engine running outside the premises 102a), and Human voice with intensity 1 (people chatting outside the premises 102a). The application server 107 may determine that the background signature includes the above identified sound categories and/or types with their respective intensity tags. The application server 107 may add a time window tag indicating the 9 am-3 pm, Friday, time window to the background signature. The application server 107 may generate multiple background signatures associated with the premises 102a, each corresponding to a respective applicable time window.

A normal activities signature may indicate audio and/or non-audio attributes of activities associated with the premises 102a when one or more users are present in the premises 102*a*. The audio attributes may comprise one or more of sound categories and/or types. The one or more of sound categories and/or types need not be arranged in a particular time order. If the application server 107 determines that the total number of premises entries is greater than the total number of premises leaves, the application server 107 may determine that one or more users are in the premises 102*a*. For example, during the training period, the application server 107 may determine that one or more of users are present in the premises 102*a* during 1 pm-4 pm on many Sundays. Similar to determining the background signature, the application server 107 may determine that the following sound categories and/or types (optionally with corresponding intensity tags) are associated with the 1 pm-4 pm, Sunday, time window: Human voice with an intensity range of 4-9 (people chatting inside the premises 102*a*), flushing toilet with intensity 5, Animal sounds with intensity 3-10, siren with intensity 1, engine with intensity 1, and TV (or radio or other device) with an intensity range of 2-8. The application server 107 may determine that the normal activities signature includes the above identified sound categories and/or types with their respective intensity tags. The application server 107 may add a time window tag indicating the 1 pm-4 pm, Sunday, time window to the normal activities signature. The application server 107 may generate multiple normal activities signatures associated with the premises 102*a*, each corresponding to a respective applicable time window.

A normal activities signature for some types of premises may include one or more of abnormal sound categories and/or types. For example, for a glass shop, glass broken may occur frequently during the working hours. A normal activities signature for the glass shop and in working hour time window(s) may include the glass broken sound type that is one of the abnormal sound categories and/or types.

Activities associated with a premises may vary depending on seasons/months of a year, days of a week, and/or other time-related factors. For example, in summer time, users associated with the premises may be on vacation frequently and leave the premise unoccupied frequently. Similar to activity signatures, different premises signatures may be generated for a single premises based on the time-related factors.

The application server 107 may associate a premises signature with an identifier of a corresponding premises, e.g., by adding an address tag indicating an address of the corresponding premises to the premises signature. The application server 107 may store premises signatures in a local database of the application server 107 and/or in a database maintained in one or more other computing devices.

At step 410, the application server 107 may continue to collect data associated with a premises periodically and/or in a predetermined time interval pattern. For example, the application server 107 may collect data from the tracking devices every 5 seconds.

At step 412, the application server 107 may determine if the collected data indicates an abnormal activity. The application server 107 may compare sound parameter values indicated by the collected audio data with the sound parameter values associated with known sound types and/or categories. Based on the comparison, the application server 107 may determine whether the collected audio data is associated with abnormal sound categories and/or types.

Sometimes, detection of abnormal sound categories and/or types does not necessarily indicate an emergency or an unlawful activity that requires authority's attention. For example, in a typical Sunday afternoon (e.g., 1 pm-4 pm), when some users chat in a family room as they usually do, another user may break a glass cup in the kitchen sink. The glass broken event may generate a glass broken sound. The glass broken sound type may be one of the abnormal sound categories and/or types. However, a false alarm may be generated if the application server 107 controls a security system to immediately trigger an alarm and/or call 911 based on detection of the glass broken sound. To reduce occurrence of false alarms, instead of controlling the security system to trigger an alarm and/or call 911 immediately after detection of an abnormal activity, and as shown step 436, triggering of an alarm and/or calling 911 may be deferred for a predetermined time (e.g., 10 seconds), and to collect additional data associated with the premises for the predetermined time.

At step 438, the application server 107 may determine whether the application server 107 has collected additional data for the predetermined time (e.g., 10 seconds). If the application server 107 has not collected additional data for the predetermined time, step 436 may be repeated to continue to collect additional data.

If the application server 107 has collected additional data for the predetermined time, and as shown at step 440, the application server 107 may determine whether the additional data matches the premises signature. For example, if the application server 107 determines that collection time tags of the additional audio data match a time window tag of one of normal activities signatures or background signatures, the application server 107 may compare the sound categories and/or types associated with the additional audio data with sound categories and/or types included in the matched normal activities signature or background signature. If all (or a sufficient quantity) of the sound categories and/or types associated with the additional audio data can be found in sound categories and/or types included in the matched normal activities signature or background signature, the application server 107 may determine that the additional audio data matches the premises signature, and may determine that the detected abnormal activity is not an emergency or an unlawful activity and does not require attention of the police or other authorities. At step 446, the application server 107 may control the security system to ignore the detected abnormal activity, or disable an alarm that has been triggered by the abnormal activity.

If one or more sound categories and/or types associated with the additional audio data cannot be found in sound categories and/or types included in the matched normal activities signature or background signature, the application server 107 may determine that the additional audio data does not match the premises signature. The application server 107 may determine that the detected abnormal activity is an emergency or an unlawful activity and require attention of the police or other authorities. At step 444, the application server 107 may control the security system to trigger an alarm and/or send a notification to an appropriate authority (e.g., calling 911).

If the application server 107 determines, at step 412, that the data collected at step 410 is not associated with abnormal sound categories and/or types, and as shown at step 414, the application server 107 may determine whether the collected data is associated with a normal entry to a premises. For example, if the collected data is associated with one or more of normal premises entry sound types, the application server 107 may determine the collected data is associated with a normal entry to a premises.

If the application server 107 determines that the collected data is not associated with a normal entry to a premises, step 410 may be repeated and the application server 107 may continue to collect data associated with the premises. If the application server 107 determines that the collected audio data is associated with a normal entry to a premises, and as shown at step 416, the application server 107 may aggregate audio and/or non-audio data for a predetermined aggregation period (e.g., 30 seconds). The aggregated data may include the data collected at step 410. The predetermined aggregation period may be a time period that is shorter than the time period (e.g., 100 seconds) for which the application server 107 collected data to generate the activity signatures during the training period, but that is longer than a smallest time interval (e.g., 5 seconds) between two adjacent data collections at step 410.

At step 418, the application server 107 may determine if the aggregated data matches any one of activity signatures associated with the premises. The application server 107 may determine an entry time, associated with a detected normal entry, based on collection time tags of the data collected at step 410. If the application server 107 determines that the entry time falls in a time window associated with an activity signature associated with the premises, the application server 107 may compare the aggregated data with this activity signature to determine if there is a match. For example, the application server 107 may determine that the entry time falls in the time window associated with the activity signature 350 (FIG. 3B). To detect a match, the application server 107 may compare the aggregated audio data with the first part (including data associated with a same length of time as the aggregated audio data) of the activity signature 350. The application server 107 may compare, by a scoring algorithm, sound categories and/or types associated with the 30-second aggregated audio data with the sound categories and/or types associated with the first 30 seconds of the activity signature 350. The first 30 seconds of the activity signature 350 are associated with the following sound categories and/or types arranged in the following order:

1: Key turning;
2: Door opening, Will alarm;
3: Door closing, Will alarm;
4: Object dropping, Will alarm;
5: Footsteps, Will alarm; and
6: Will alarm.

The application server 107 may determine a score for the first 30 seconds of the activity signature 350. To determine that score, each sound category or type gets 1 point, and each occurrence of each sound category and/or type gets an additional 2 points. The first 30 seconds of the activity signature 350 is associated with 6 sound types, i.e., key turning, door opening, door closing, object dropping, footsteps, and will alarm. Each of the 6 sound type gets 1 point, adding 1×6=6 points to the score. In the first 30 seconds of the activity signature 350, the key turning sound type occurs once, the door opening sound type occurs once, the door closing sound type occurs once, the object dropping sound type occurs once, the footsteps sound type occurs once, and the will alarm sound type occurs 5 times. Two points are added to the score for each of the sound types that occurs once (key turning, door opening, door closing, object dropping, and footsteps), resulting in an added 2×5=10 points. Two points are added for each of the 5 occurrences of the will alarm sound type, resulting in a further 10 points. The full score for the first 30 seconds of the activity signature 350 is (1×6)+(2×5)+(2×5)=26 points.

An example of aggregated audio data for a 30-second time period, referred to below as the example 30-second aggregated audio data, may be associated with the following sound categories and/or sound types arranged in the following order:

1: Key turning;
2: Door opening, Will alarm;
3: Door closing, Will alarm;
4: Will alarm;
5: Footsteps, Will alarm; and
6: Will alarm.

Compared to first 30 seconds of the activity signature 350, the example 30-second aggregated audio data is not associated with the object dropping sound type.

The application server 107 may determine a score for the example 30-second aggregated audio data. One point may be added to that score for each distinct sound category or type, associated with the example 30-second aggregated audio data, that matches a distinct sound category or type associated with the first 30 seconds of the activity signature 350. Additional points may be added based on relative position of sound categories or types associated with the example 30-second aggregated audio data. In this context, relative position may refer to an interval of the example 30-second aggregated audio data with which a sound category or type may be associated. In the above example, the key turning sound type is associated with the first interval, the door closing and will alarm sound types are associated with the second interval, etc. For each sound category or type associated with the example 30-second aggregated audio data that has a relative position that is the same as a relative position of a matching sound type or category associated with the first 30 seconds of the activity signature 350, an additional two points is added to the score for the example 30-second aggregated audio data.

For the example 30-second aggregated audio data, 1 point may be added to the score for each of the 5 associated sound types that matches a sound type associated with the first 30 seconds of the activity signature 350 (key turning, door opening, door closing, footsteps, and will alarm), resulting in 1×5=5 points. Two points may be added for each the following: (i) the key turning sound type associated with the first interval of the example 30-second aggregated audio data, (ii) the door opening sound type associated with the second interval of the example 30-second aggregated audio data, (iii) the will alarm sound type associated with the second interval of the example 30-second aggregated audio data, (iv) the door closing sound type associated with the third interval of the example 30-second aggregated audio data, (v) the will alarm sound type associated with the third interval of the example 30-second aggregated audio data, (vi) the will alarm sound type associated with the fourth interval of the example 30-second aggregated audio data, (vii) the footsteps sound type associated with the fifth interval of the example 30-second aggregated audio data, (viii) the will alarm sound type associated with the fifth interval of the example 30-second aggregated audio data, and (ix) the will alarm sound type associated with the sixth interval of the example 30-second aggregated audio data. This add 9×2=18 points, yielding a total score for the example 30-second aggregated audio data of 5+18=23 points.

A match rate may be a ratio of the score for the first 30 seconds of the activity signature 350 and the score for the example 30-second aggregated audio data. If the match rate is greater than a predetermined threshold (e.g., 50%), the application server 107 may determine that the example 30-second aggregated audio data matches the activity signature 350. Otherwise, the application server 107 may determine that the example 30-second aggregated audio data does not match the activity signature 350. In this example, the match rate is 23/26=88%. The application server 107 may determine that audio data associated with this detected normal entry matches the activity signature 350.

The application server 107 may take one or more sound characteristics (e.g., sound intensity that is indicated by an intensity tag) into account by assigning points for matches of the one or more sound characteristics between the aggregate data and an activity signature. The application server 107 may take non-audio data (e.g., the network settings associated with a user's mobile device) into account by assigning points for matches of the non-audio data between the aggregate data and an activity signature. Other comparison algorithms may be used to determine a match rate between aggregated data and an activity signature.

If the application server 107 determines that the aggregate data does not match any one of activity signatures associated with a premises, additional data may be collected (step 436). If aggregated data matches one of the activity signatures associated with the premises, the application server 107 may perform one or more tasks based on the match (step 420).

At step 420, the application server 107 may perform one or more actions based on a match between the aggregated data and an activity signature associated with a premises. The application server 107 may control the security system, the TV, the set-top box, the radio, the air conditioner, the lights, or any other controllable devices or systems associated with the premises to perform or cause performance of actions that are indicated by audio and/or non-audio data associated with a matched activity signature. The application server 107 may determine that one or more actions are indicated by one or more of sound categories and/or types included in a matched activity signature, and may determine that the one or more actions may be performed by the controllable devices or systems. The application server 107 may send data signals, command data, and/or messages to the controllable devices or systems, and the controllable devices or systems may perform one or more actions based on the received data signals, command data, and/or messages. So, without user's interaction, the one or more actions may be automatically performed. For example, the disarm sound type of the activity signature 350 (FIG. 3B) indicates that the user B typically disarms a security system when she enters the premises 102a. After the application server 107 determines that the aggregated audio data matches the activity signature 350, the application server 107 may send a disarming command, via the gateway 111, to the security system. After receiving the disarming command, the security system may disarm itself. Similarly, the application server 107 may perform or cause performance of one or more actions (e.g., controlling, by sending a data signal to a TV, the TV to turn on and select the ESPN channel for display) indicated by non-audio data (e.g., a service tag indicating the ESPN channel) associated with a matched activity signature (e.g., the activity signature 300).

An activity signature may include data (e.g., data indicating a figure category of a user, a user's network settings, user's profile associated with an activity signature, etc.) that may be used to determine if the user is an adult. The application server 107 may determine, based on a matched activity signature, whether the user just entering a premises is an adult.

If a user just entering a premises is not an adult, the application server 107 may cause a notification (e.g., email messages, SMS message, etc.) to be sent to the user's guardian to inform the user's guardian that the user has arrived at the premises. If a user just entering the premises is an adult, the application server 107 may send notifications to one or more delivery companies, which may subscribe to notification services, indicating that an adult is now present at the premises.

After the delivery companies are notified of the presence of an adult at a premises, the delivery companies may determine, based on their databases, whether there are any packages that require an adult's authorization (e.g., an adult signing on a delivery slip) for delivery. If there are one or more packages that require an adult's authorization for delivery, the delivery companies may send delivery personnel to the premises to deliver the one or more packages.

Sometimes, by the time the delivery personnel arrive, the adult may have left the premises and nobody else may be present. The delivery companies may send requests to the application server 107 for entering the premises to deliver the packages. After receiving the requests, the application server 107 may unlock an electronic lock of a front door of the premises and allow the delivery personnel to enter the premises to deliver packages. If the application server 107 determines that the entry is completed (e.g., based on data, received from a security system of the premises, indicating whether the front door is closed), the application server 107 may lock the front door. The application server 107 may send a request for delivery authorization to the adult. For example, the application server 107 may send the adult an email or an SMS message comprising an interactive interface for the adult to input his or her delivery authorization. The application server 107 may activate one or more of cameras installed at the front door to generate a video associated with this delivery. The application server 107 may record data associated with one or more of a delivery time, an identifier of the delivery company, an identifier of the delivery personnel, identifier(s) of the delivered package(s), and/or other information related to this delivery. The video and data may be stored in one or more databases for a predetermined time (e.g., 90 days). The stored video and data may be available for review to the users associated with the premises and/or to authorities that investigate events that are associated with the premises. If no request for review is received within the predetermined time, the application server 107 may delete the data from the one or more databases.

At step 422, the application server 107 may periodically aggregate the collected data for a certain time duration (e.g., 24 hours) to determine if signatures associated with a premises should be updated and/or to further determine if an emergency is associated with the premises. For example, if the training period expires at 3:40 am on Day 1, the application server 107 may aggregate the collected data for 24 hours from 3:40 am on Day 1 to 3:40 am on Day 2, may restart the data aggregation for another 24 hours from 3:40 am on Day 2 to 3:40 am on Day 3, and so on. By controlling a timer that is set to be equal to the certain time duration, the application server 107 may determine whether the application server 107 has aggregated the collected data for the certain time duration.

If the application server 107 determines that the application server 107 has not aggregated the collected data for the certain time duration, step 410 may be repeated to continue to collect and aggregate data. If the application server 107 has aggregated the collected data for the certain time duration, the signatures may be updated at step 430.

Over time, new events may occur at the premises 102a. The application server 107 may update the activity signatures and the premises signature based on the new events. If a premises welcomes a baby, the application server 107 may add a baby crying sound type in the premises signature. If a premises welcomes a new roommate, the application server 107 may add a new activity signature for the new roommate. If a user recovers from an injury that may have affected the user's mobility, the gestures and gait of that user may change. The application server 107 may update the activity signature associated with this user based on the changed gestures and gait. A change of seasons may affect user's habits. For example, when summer is over, a child may go back to school. Compared to activity schedules in summer when the child does not go to school, the child's activity schedules may change when he goes back to school. The application server 107 may update the activity signature associated with this child. When winter comes, a user may spend longer time to take off his coats and boots when he enters the premises. The application server 107 may update the activity signature associated with this user based on the extended changing time.

At step 430, the application server 107 may determine, based on the aggregated data from step 422, whether the activity signatures and/or the premises signature for the premises 102a should be updated. The application server 107 may have stored the data collected during the 60-day (Day 1 to Day 60) training period in one or more databases. At Day 61, the application server 107 may aggregate additional data for 24 hours and update the stored data by deleting the data collected at Day 1 and adding the additional 24-hour data aggregated at Day 61. At the end of Day 61, the application server 107 may process the updated data, and update the activity signatures and/or the premises signature associated with the premises as needed. Similar to generating the activity signatures and/or the premises signature during the training period, the activity signatures and/or the premises signature may be updated by the machine learning technology and/or based on a user's input.

At step 454, the application server 107 may determine whether one or more users are in the premises 102a. If no user is in the premises 102a, the 24-hour timer may be reset at step 472, and step 410 begun again.

If one or more users are in the premises 102a, the application server 107 may determine, at step 456, whether one or more certain of sound types have not occurred for the past certain time duration (e.g., 24 hours). Absence of certain sound types may indicate an emergency. For example, absence of the toilet flushing sound type for 24 hours may indicate that the user at the premises 102a is very sick and in need of assistance. If the application server 107 determines that certain sound types have been absent for the past certain time duration, the application server 107 may send, at step 458, notifications (e.g., emails, telephone calls, SMS messages, etc.) to the user's contacts on the record, and/or activate an emergency line (e.g., calling 911) to get assistance for the user. As another example, absence of the animal sounds sound type (with an intensity range of 4-8) for a predetermined time duration (e.g., 1 hour) in a certain time window (e.g., the 9 am-3 pm, Friday, time window) may indicate that an indoor pet may be left outside of the premises. After detecting the absence of the animal sounds sound type for the last 1 hour, the application server 107 may send notifications to notify one or more users associated with this premises that an indoor pet may be left outside of the premises.

If the application server 107 does not detect absence of certain sound types, the timer may be reset at step 472 and step 410 begun again.

With the example method shown in FIG. 4, the system may generate one or more signatures for a premises and/or for individuals associated with the premises, may compare data associated with the premises with these signatures, may identify an individual based on the comparison and control devices/systems associated with the premises to automatically perform actions for an identified user, and/or may detect abnormal activities (e.g., home intrusions, smoke and/or fire, police activities in neighborhood, indoor pets left outside of the premises, individual sick at home) associated with the premises and take actions (e.g., calling 911) based on these detected abnormal activities.

The order of the steps in FIG. 4 may vary. For example, step 408 may occur parallel to or prior to step 406. One or more of the steps may be omitted. Steps may be combined and/or otherwise modified.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a computing device and during a time period associated with an entry into a premises by a user, audio data associated with sounds occurring during the entry, wherein the audio data comprises a first series of sound type indicators, and wherein the sound type indicators of the first series indicate types of the sounds occurring during the entry;
   comparing the first series of sound type indicators to a second series of sound type indicators associated with one of a plurality of audio signatures, wherein the sound type indicators of the second series indicate multiple types of sounds, wherein each of the sound type indicators of the second series is associated with one of multiple time intervals during a signature period, and wherein the second series is associated with a sequence of actions performed by the user for each of a plurality of entries into the premises; and
   causing, based on the comparing, a device associated with the premises to perform an action.

2. The method of claim 1, wherein the one of the plurality of audio signatures comprises, for at least one of the multiple time intervals, multiple sound type indicators.

3. The method of claim 1, further comprising:
   updating, based on the received audio data, the one of the plurality of audio signatures.

4. The method of claim 1, further comprising:
   determining, based on one of the sound type indicators of the second series, the action.

5. The method of claim 1, wherein:
   the comparing comprises: comparing the first series of sound type indicators to an additional audio signature,
   the one of the plurality of audio signatures is associated with a first recurring time window,
   the additional audio signature is associated with a second recurring time window different than the first recurring time window, and the additional audio signature comprises one or more sound type indicators also comprised by the one of the plurality of audio signatures.

6. The method of claim 1, wherein the causing the device to perform the action comprises one or more of:
   disarming a security system associated with the premises, or
   causing a device associated with the premises to output content of a service associated with the one of the plurality of audio signatures.

7. The method of claim 1, wherein the sound type indicators of the second series indicate one or more of the following types of sounds: a human voice sound type, an animal sounds sound type, an inaudible mechanical sounds sound type, an audible mechanical sounds sound type, an alert sounds sound type, or an absence of sound sound type.

8. The method of claim 1, further comprising:
   generating, based on audio data collected during a training period, the plurality of audio signatures.

9. The method of claim 1, wherein the comparing comprises:
   determining that a relationship, between a score for the received audio data and a score for the one of the plurality of audio signatures, satisfies a threshold.

10. The method of claim 9, further comprising determining the score for the one of the plurality of audio signatures based on:
    a quantity of the multiple types of sounds indicated by the second series of sound type indicators, and
    a quantity of occurrences of each of the multiple types of sounds indicated by the second series of sound type indicators.

11. The method of claim 9, further comprising determining the score for the received audio data based on:
    a quantity of common types of sound, wherein the common types of sound are types of sound that are indicated by the first series of sound type indicators and by the second series of sound type indicators,
    an order, indicated by the first series of sound type indicators, of the common types of sound, and
    an order, indicated by the second series of sound type indicators, of the common types of sound.

12. The method of claim 1, further comprising:
    generating, based on audio data received during time periods associated with previous entries into the premises and comprising sound type indicators of the first series, the plurality of audio signatures.

13. The method of claim 1, wherein at least one of the plurality of audio signatures comprises a sound type indicator that indicates a verbal sound type.

14. The method of claim 1, wherein the multiple types of sounds comprise a sound associated with the user interacting with an object in the premises.

15. A method comprising:
    determining, by a computing device, a score for one of a plurality of audio signatures, wherein each of the plurality of audio signatures is associated with a behavior pattern of a user, of a plurality of users, entering a premises, and wherein the score for the one of the plurality of audio signatures is determined based on:
        a quantity of sound types indicated by the one of the plurality of audio signatures, and
        a quantity of occurrences of each of the sound types indicated by the one of the plurality of audio signatures;
    determining a score for audio data associated with the premises and indicating sound types, wherein the score for the audio data is determined based on:
        a quantity of common sound types, wherein the common sound types are sound types that are indicated by the audio data and by the one of the plurality of audio signatures,
        an order, indicated by the audio data, of the common sound types, and
        an order, indicated by the one of the plurality of audio signatures, of the common sound types; and
    causing, based on the score for the one of the plurality of audio signatures and the score for the audio data, a device associated with the premises to perform an action.

16. The method of claim 15, wherein the causing the device to perform the action comprises one or more of:
    disarming a security system associated with the premises, or
    causing a device associated with the premises to output content of a service associated with the one of the plurality of audio signatures.

17. The method of claim 15, wherein the sound types indicated by the one of the plurality of audio signatures comprise one or more of: a human voice sound type, an animal sounds sound type, an inaudible mechanical sounds sound type, an audible mechanical sounds sound type, an alert sounds sound type, or an absence of sound sound type.

18. The method of claim 15, wherein the one of the plurality of audio signatures indicates that multiple sound types correspond to at least one of multiple time intervals during a signature period.

19. A method comprising:
    determining, based on first audio data received from a premises, a potential occurrence of an alarm-triggering event;
    determining, based on the potential occurrence of the alarm-triggering event and based on a first sound type associated with the first audio data, to defer triggering an alarm;
    during an alarm deferral period associated with the determining to defer triggering the alarm, receiving second audio data from the premises;
    determining, based on a second sound type associated with the second audio data and indicative of an authorized entry of the premises, and based on comparing the second audio data with an audio signature associated with a sequence of actions performed by a user for each of a plurality of entries into the premises, whether the alarm-triggering event occurred; and
    controlling, based on determining whether the alarm-triggering event occurred, an alarm system of premises.

20. The method of claim 19, wherein the second audio data comprises a series of sound type indicators, and wherein the sound type indicators indicate types of sounds occurring during the alarm deferral period.

21. The method of claim 19, wherein the controlling comprises one of:
    triggering, based on a determination that the alarm-triggering event occurred, an alarm associated with the premises; or
    ignoring, based on a determination that the alarm triggering event did not occur, the potential occurrence of the alarm-triggering event.

22. The method of claim 19, wherein the sequence of actions performed by the user comprises at least one of turning a key, opening a door, closing a door, dropping a key, walking, looking at a phone, disarming a security system, opening a closet, closing a closet, interacting with a pet, listening to music, taking food from refrigerator, cooking, or washing food.

23. The method of claim 19, wherein the determining to defer triggering the alarm is further based on determining that the first sound type associated with the first audio data is a glass broken sound.

24. The method of claim 19, wherein the determining whether the alarm-triggering event occurred comprises determining, based on the second audio data matching the audio signature associated with the behavior pattern of the user enteringsequence of actions performed by the user for each of the plurality of entries into the premises, that the alarm-triggering event did not occur.

* * * * *

UNITED STATES PATENT AND TRADEMARK OFFICE
CERTIFICATE OF CORRECTION

PATENT NO. : 11,968,323 B2
APPLICATION NO. : 16/229087
DATED : April 23, 2024
INVENTOR(S) : Mark Hashimoto Page 1 of 1

It is certified that error appears in the above-identified patent and that said Letters Patent is hereby corrected as shown below:

In the Claims

Column 29, Lines 12-13:
In Claim 24, delete "behavior pattern of the user enteringsequence" and insert --sequence--

Signed and Sealed this
Twenty-second Day of July, 2025

Coke Morgan Stewart
*Acting Director of the United States Patent and Trademark Office*